United States Patent
Harvey et al.

(10) Patent No.: US 7,418,820 B2
(45) Date of Patent: Sep. 2, 2008

(54) WIND TURBINE WITH HYDRAULIC TRANSMISSION

(75) Inventors: Alexander S. Harvey, Edmonton (CA); David McConnell, Edmonton (CA)

(73) Assignee: MHL Global Corporation Inc., Edmonton, Alberta (CA)

(*) Notice: Subject to any disclaimer, the term of this patent is extended or adjusted under 35 U.S.C. 154(b) by 0 days.

(21) Appl. No.: 10/509,706

(22) PCT Filed: May 16, 2003

(86) PCT No.: PCT/CA03/00717

§ 371 (c)(1), (2), (4) Date: Apr. 17, 2006

(87) PCT Pub. No.: WO03/098037

PCT Pub. Date: Nov. 27, 2003

(65) Prior Publication Data

US 2006/0210406 A1 Sep. 21, 2006

Related U.S. Application Data

(60) Provisional application No. 60/319,249, filed on May 16, 2002.

(51) Int. Cl.
 F03D 11/02 (2006.01)
 F03D 9/00 (2006.01)
(52) U.S. Cl. .......................... 60/487; 60/398
(58) Field of Classification Search ............ 60/487; 417/334
See application file for complete search history.

(56) References Cited

U.S. PATENT DOCUMENTS

| 3,952,723 | A | 4/1976 | Browning |
| 4,149,092 | A | 4/1979 | Cros |
| 4,161,658 | A | 7/1979 | Patrick |
| 4,503,673 | A | 3/1985 | Schachle et al. |
| 5,746,056 | A * | 5/1998 | Smith ..................... 60/447 |
| 2005/0155346 | A1 | 7/2005 | Nikolaus |

FOREIGN PATENT DOCUMENTS

| DE | 30 25 563 A | | 2/1981 |
| DE | 3025563 A | * | 2/1981 |
| EP | 1430221 | | 6/2004 |
| WO | WO 02/084839 A2 | | 10/2002 |
| WO | 03/029649 | | 4/2003 |

OTHER PUBLICATIONS www.awea.org/faq/basicpp.html; "Basic Principles of Wind Turbine Power Production", American Wind Energy Association, 1998.

(Continued)

*Primary Examiner*—Thomas E Lazo
(74) *Attorney, Agent, or Firm*—Bennett Jones LLP

(57) ABSTRACT

A wind turbine includes a closed loop hydrostatic transmission. The rotor is directly coupled to a low-speed high torque hydraulic motor, which is pressure-reversible to act as a pump. A variable displacement, pressure compensated hydrostatic transmission receives the hydraulic fluid output and drives a generator. The hydrostatic transmission and the generator may be compactly located in the nacelle of wind turbine tower.

14 Claims, 3 Drawing Sheets

OTHER PUBLICATIONS www.eren.doe.gov/wind/components.html; "Building Better Components for Tomorrow's Turbines", U.S. Department of Energy, 2001.

www.eren.doe.gov/wind/feature.html; "Find Out About How the Turbine Works", U.S. Department of Energy, 2001.

U.S. Department of Energy, "Wind Power Today", Wind Energy Program Highlights, 2000.

www.awea.org/faq/basicen.html; "How Does A Wind Turbine's Energy Production Differ from Its Power Production?", American Wind Energy Association, 1998.

www.nrel.gov/wind/compnts2.html; "Innovative Components and Subsystems", National Wind Technology Center, 2001.

www.nrel.gov/wind/wind_bib.html; "Wind Energy Bibliography" U.S. Department of Energy, National Technical Information Service, 2001.

www.windpower.dk/tour/wtrb/indirect.html; "Indirect Grid Connection of Wind Turbines", Danish Wind Industry Association, 1998.

www.windpower.dk/tour/wtrb/async.html; "Asynchronous (Induction) Generators", Danish Wind Industry Association, 1998.

www.windpower.dk/tour/wtrb/genpoles.html; "Changing Generator Rotational Speed", Danish Wind Industry Association, 1998.

www.windpower.dk/tour/grid/rein.html; "Wind Turbines and Power Qualtiy Issues", Danish Wind Industry Association, 2000.

www.windpower.dk/tour/wtrb/syncgen.html; "Synchronous Generators", Danish Wind Industry Association, 1998.

www.windpower.dk/tour/wtrb/electric.html; "Wind Turbine Generators", Danish Wind Industry Association, 2000.

www.windpower.dk/tour/wtrb/varislip.html; "Variable Slip Generators for Wind Turbines", Danish Wind Industry Association, 1998.

www.windpower.dk/tour/wtrb/control.html; "The Electronic Wind Turbine Controller", Danish Wind Industry Association, 2000.

www.windpower.dk/tour/wtrb/powtrain.html; "Gearboxes for Wind Turbines", Danish Wind Industry Association, 2000.

www.windpower.dk/tour/wtrb/powerreg.html; "Power Control of Wind Turbines", Danish Wind Industry Association, 1999.

www.windpower.dk/tour/wrs/enrspeed.html; "The Power of the Wind: Cube of Wind Speed", Danish Wind Industry Association, 2000.

www.windpower.dk/tour/wres/tube.html; "Wind Turbines Deflect the Wind", Danish Wind Industry Association, 1999.

www.windpower.dk/tour/wres/enerwind.html; "The Energy in the Wind: Air Density and Rotor Area", Danish Wind Industry Association, 1999.

www.windpower.dk/tour/wres/localwin.html; "Local Winds: Sea Breezes", Danish Wind Industry Association, 1998.

www.windpower.dk/tour/wres/mount.html; "Local Winds: Mountain Winds", Danish Wind Industry Association, 1998.

www.windpower.dk/tour/wres/geostr.html; "The Geostrophic Wind", Danish Wind Industry Association, 1999.

www.windpower.dk/tour/wres/globwin.html; "Wind Energy Resources: Global Winds", Danish Wind Industry Association, 2000.

www.windpower.dk/tour/wres/coriolis.html; "The Coriolis Force", Danish Wind Industry Association, 1998.

www.windpower.dk/tour/wres/index.html; "Where does Wind Energy come From?", Danish Wind Industry Association, 2002.

* cited by examiner

WIND TURBINE WITH HYDRAULIC TRANSMISSION

CROSS-REFERENCE TO RELATED APPLICATION

This application claims the priority benefit of U.S. Provisional Application No. 60/319,249 filed on May 16, 2002 and entitled Wind Turbine with Hydrostatic Transmission, the contents of which are incorporated herein by reference.

FIELD OF THE INVENTION

The present invention relates to wind turbines for electricity generation.

BACKGROUND OF THE INVENTION

Wind turbines use wind energy to generate electricity. A conventional wind turbine includes a rotor mounted on a tower. The rotor may turn up to about 60 rpm in a steady wind of about 20 mph and connect to an alternator/generator through a speed increasing transmission. Typical generators include synchronous or asynchronous generators and require a constant input shaft speed of about 1200 or 1800 rpm, depending on the type of generator, to produce quality power. Although variable speed generators are available, the power output of a variable speed generator must be conditioned before it can be fed into a power grid.

It is a continuing problem with wind-driven turbines to provide a cost-effective method of smoothing the torque generated by the rotor so as to reduce torque fluctuations in the drivetrain to the generator. It is known to use complex transmissions to attempt to provide constant speed input to a generator. It is also known to use variable pitch rotors and braking mechanisms in an effort to operate at a constant rotor speed. However, such transmissions, variable pitch rotors and braking mechanisms are expensive, prone to mechanical breakdown and introduce a significant source of mechanical inefficiency to the wind turbine operation.

Wind turbines using an open loop hydraulic system in place of mechanical transmissions are also known. However, conventional hydraulic pumps require input speed of a minimum of about 300 to 500 rpm to produce usable hydraulic pressure. As a result, a mechanical speed increaser is still required between the rotor and the hydraulic pump. All known hydraulic systems for wind turbines utilize an open loop system. For example, in U.S. Pat. No. 4,503,673, a positive displacement hydraulic pump connected to a variable displacement hydraulic motor is disclosed. In this system, similar to other open loop systems, the hydraulic pump is elevated on the tower but the hydraulic motor, hydraulic fluid reservoir and generator are on the ground. Although it is generally advantageous to reduce the tower load, this arrangement necessitates long hydraulic fluid hoses to and from the hydraulic pump, which is disadvantageous.

A closed-loop hydraulic system would permit all of the components, including the generator to be tower mounted in the nacelle. However, a closed-loop system has not been attempted because of the difficulty in dealing with overspeed situations. In a closed loop system, hydraulic resistance to the increased torque would result in intolerable heat buildup in the system, if fluid pressure is not controlled.

In an open-loop hydraulic system, when the rotor is driven at high speed, excess hydraulic pressure may be diverted by "dumping" pressure to maintain a constant generator speed. This energy dissipation generates tremendous amounts of heat and active cooling or heat exchanging is necessary. For example, in U.S. Pat. No. 4,149,092, a hydraulic system for water and wind driven turbines is disclosed which includes a shunt-connected energy dissipator. In response to high pressure caused by high wind and rotor speeds, the displacement of the hydraulic motor decreases, further increasing system pressure. As a result, the hydraulic fluid is diverted into the energy dissipator. The dissipator converts hydraulic energy into heat which is removed by a heat exchanger.

In U.S. Pat. No. 4,503,673, referred to above, complex hydraulic controls are used to feather the rotor propeller blades in order to deal with excess pressure in the hydraulic circuit.

Therefore, there is a need in the art for a wind turbine system utilizing a closed loop hydrostatic transmission which mitigates the difficulties of the prior art.

SUMMARY OF THE INVENTION

In a conventional hydrostatic transmission, as shown in prior art FIG. 1, a prime mover drives a pump which converts power into hydraulic pressure. The hydraulic pressure is then transmitted to a hydraulic motor which converts the pressure back into power, which may then be used to power a load. The hydraulic fluid returns to a reservoir, which feeds the pump. In the context of prior art wind turbines, the rotor is the prime mover and the load is the electrical generator.

In the field of hydrostatic transmissions, an "overrunning" or "overhauling" load condition is a state where a hydraulic motor is mechanically driven by its load, rather than the converse. An example of an overrunning load is the instance when a vehicle with a hydrostatic transmission is driven down a downgrade. In that case, the road wheels impart torque to the hydraulic motor which in turn acts on the pump. It is assumed that both the motor and the pump are pressure reversible. The pump may then regenerate horsepower back into the prime mover. In effect, the pump and motor exchange functions and energy flows in reverse to that shown in FIG. 1. This ability of the pump to regenerate power in the prime mover is referred to as dynamic braking capability.

The inventors have discovered that a closed loop hydraulic system which may effectively deal with an "overrunning" load condition, in other words having dynamic braking capability, may successfully be applied to a wind turbine to provide efficient transmission of energy from the turbine rotor to the generator. An induction motor may typically absorb more horsepower as a generator than it develops as a motor.

Therefore, in one aspect, the present invention is directed to a closed-loop hydraulic system for use in a wind turbine which converts wind energy to electrical power. In one embodiment, the closed loop hydraulic system is compact enough to be tower mounted in the nacelle of a wind turbine with a generator.

The applicants have found that a low-speed, high torque hydraulic motor driven by the wind turbine rotor at a low speed to create an overrunning load condition, may efficiently drive such a hydraulic system as a hydraulic pump. The motor acting as a pump is preferably directly driven by the rotor, without any speed increasing gears. Similarly, a variable displacement pump which is driven by the overrunning load to reverse its function may be effectively used to drive the electrical generator.

The reversal of component roles permits the electrical startup of the rotor in a startup procedure, which may permit electricity generation at windspeeds lower than with conventional systems.

In this specification, the components shall be referred to by their normal intended function, as opposed to their effective function during normal operating conditions of the present invention. Therefore, the hydraulic motor is referred to a motor, despite the fact that during normal operating conditions of the invention, it acts as a pump because of the overrunning load. In one embodiment, the hydraulic motor is preferably a low-speed, high torque motor. As well, the hydraulic pump or transmission will be referred to as a transmission, although it functions as a motor to drive the generator during operation. In one embodiment, the transmission is preferably a pressure compensated hydrostatic transmission, which is capable of decreasing displacement in a drive mode to maintain system pressure and increase displacement in an overrunning mode to maintain system pressure.

Accordingly, in one aspect of the invention, the invention comprises a wind turbine comprising:
 (a) a rotor;
 (b) a generator;
 (c) a low-speed positive displacement hydraulic motor driven by the rotor to act as a hydraulic pump;
 (d) a variable displacement hydraulic transmission which is connected to and drives the generator as a motor;
 (e) a closed loop hydraulic oil circuit for carrying pressurized oil to the transmission from the motor and to return oil to the motor from the pump; and
 (f) means for varying the displacement of the transmission in response to variations in pressure within the oil circuit.

In another aspect of the invention, the invention may comprise a method of generating electricity from wind power using a tower-mounted rotor, and a generator, comprising the steps of:
 (a) directly coupling a low-speed, high torque hydraulic motor to the rotor, such that the motor may act as a pump, turning at a rotational speed of less than 100 rpm when driven by the rotor;
 (b) operatively connecting a variable displacement hydraulic transmission to the hydraulic motor by a closed hydraulic circuit such that the transmission acts as a motor;
 (c) coupling the transmission to a generator, driving the generator at speed effective to produce electricity.

Preferably, the displacement of the hydraulic transmission is varied in response to variations in the pressure generated by the hydraulic motor acting as a pump. The method may include the step of exchanging heated oil for cooler oil, during wind-driven operation, in a hot oil shuttle which forms part of the closed hydraulic circuit.

In another aspect, the invention may comprise a wind turbine tower comprising a rotor, a generator and a closed loop hydraulic power transmission system comprising:
 (a) a low-speed positive displacement hydraulic motor which is driven by the rotor without speed increasing gears;
 (b) a variable displacement hydraulic transmission which is connected to and drives the generator and which includes means for varying the displacement of the transmission in response to changes in pressure in the hydraulic system;
 (c) a closed loop oil circuit for carrying pressurized oil to the pump from the motor and to return oil to the motor from the pump;
 (d) wherein the rotor-driven motor and transmission operate under an overrunning load condition to drive the generator; and wherein
 (e) the generator and closed loop hydraulic power transmission system are tower mounted above ground.

BRIEF DESCRIPTION OF THE DRAWINGS

The invention will now be described by way of an exemplary embodiment with reference to the accompanying simplified, diagrammatic, not-to-scale drawings. In the drawings.

DETAILED DESCRIPTION OF THE INVENTION

The present invention provides for a wind turbine having a closed loop hydraulic system to transfer torque from the wind-driven rotor to a generator. When describing the present invention, all terms not defined herein have their common art-recognized meanings. As used herein, a "closed loop" hydraulic system is equivalent to a closed circuit hydraulic system and refers to a hydraulic system where a substantial portion of the hydraulic fluid returns directly to the hydraulic pump after passing through the hydraulic motor. In a closed loop system, the hydraulic fluid does not return to an open fluid reservoir or tank but rather flows in a complete path from the pump, through a conductor to the motor and back to the pump. As used herein, "hydraulic oil" of "oil" refers to any suitable hydraulic fluid as is well known in the art.

The present invention incorporates principles of hydraulic power transmission and control systems for hydraulic power transmission systems. A person skilled in the art may have reference to sources such as Principles of Hydraulic System Design (Chapple, P., Coxmoor Publishing Co., 2002), the contents of which are incorporated herein by reference.

In one embodiment, the hydraulic motor, pump and electrical generation system of the present invention are intended to be mounted in a nacelle (not shown) elevated on a tower having a wind-driven rotor. The rotor and propeller blades may be of any design. However, it is conceivable that components of the system may be housed at ground level and still be comprised within the scope of the present invention. As well, the present invention may be adapted by one skilled in the art to any wind turbine or water-driven system where the wind or water energy creates a relatively slow input shaft speed, in the order of less than about 1000 rpm and more preferably in the order of less than about 100 rpm. The present invention is described herein as adapted to a horizontal axis wind turbine. One skilled in the art may realize that the present invention may equally be adapted to a vertical axis wind turbine.

Figure 1:
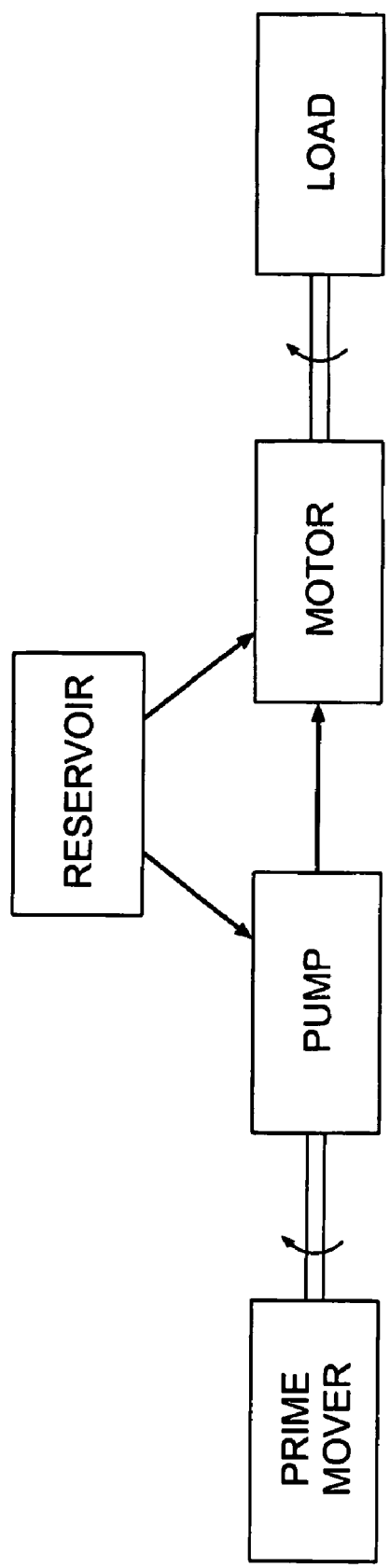
FIG. 1 is a schematic representation of a prior art hydrostatic transmission.
Figure 2:
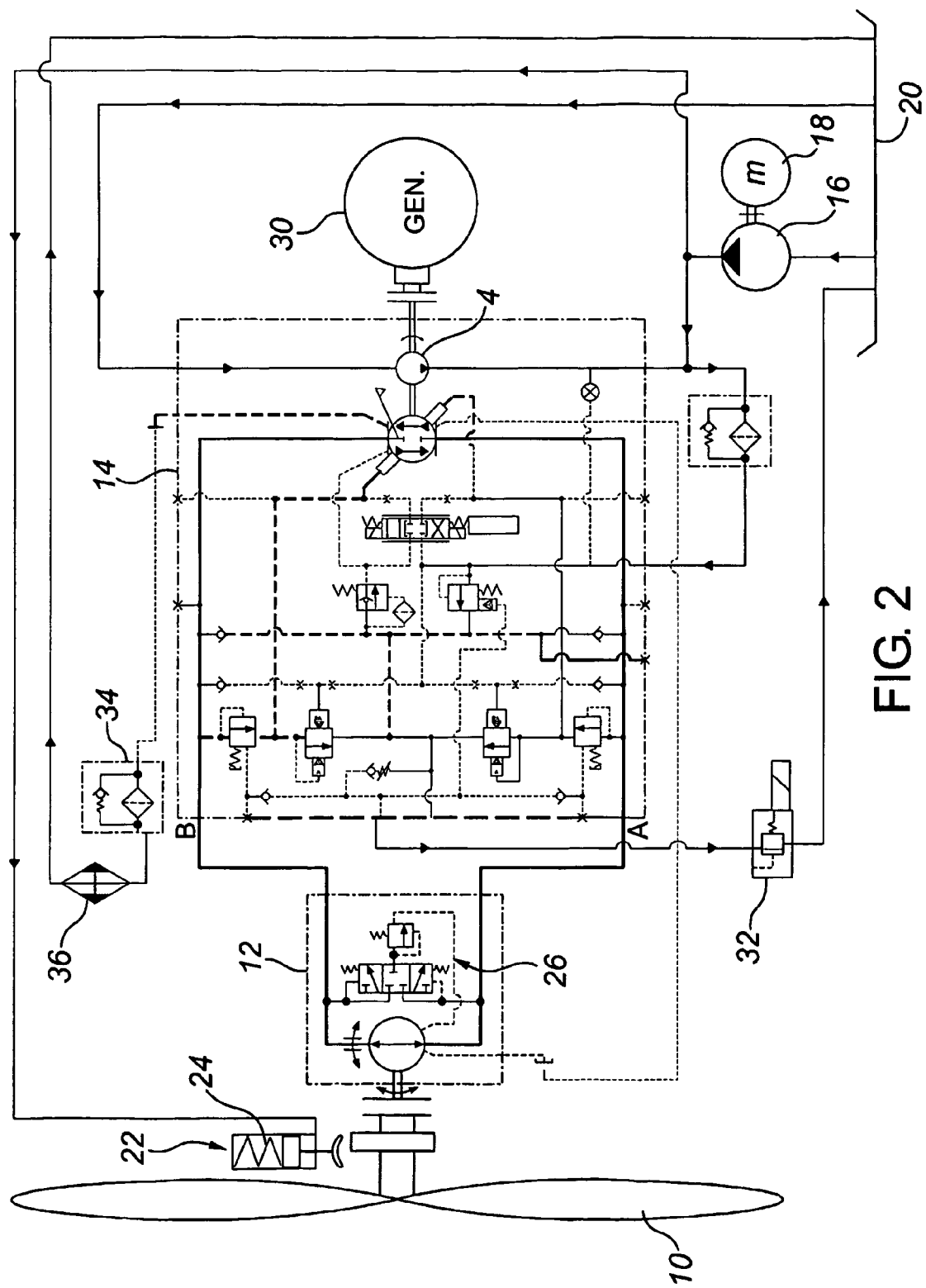
FIG. 2 is a schematic representation of one embodiment of the present invention.

An exemplary closed loop hydraulic circuit is shown schematically in FIG. 2. In general terms, the rotor (10) drives a hydraulic motor (12), in effect turning it into a pump. As used herein, the rotor comprises the rotating blade assembly and hub of a wind turbine. In a preferred embodiment, the rotor (10) drives the motor (12) without any gearbox or mechanical speed increasing means. Wind driven rotors in a wind turbine typically do not exceed 60 rpm to 80 rpm. Therefore, a preferred motor (12) will be able to produce adequate flow with an input shaft speed of less than about 100 rpm and more preferably less than about 60 rpm.

In one embodiment, the motor (12) is a low-speed, high torque hydraulic motor. Suitable motors include Denison Calzoni™ motors (Denison Hydraulics, Marysville, Ohio, U.S.) and similar motors available from numerous other manufacturers. A preferred embodiment may comprise a Calzoni™ MR/MRE or larger displacement hydraulic motors. The contents of a Calzoni™ product manual (RCOa-1806/07.01) published by Denison Hydraulics Inc. are hereby incorporated by reference. Calzoni™ motors are radial piston fixed displacement motors. One skilled in the art will recognize that the term "low-speed, high torque" refers to a motor designed to generate high torque and have a maximum output shaft speed of less than about 1000 rpm and preferably less than about 600 rpm.

The hydraulic motor (12) drives a hydrostatic transmission (14) in a dynamic braking situation. Suitable transmissions (14) preferably comprise variable displacement, pressure compensated hydraulic transmissions which have dynamic braking capability to regenerate power into the generator (30). Variable displacement, pressure compensated hydraulic transmissions are well known in the art, along with the control mechanisms for controlling displacement variations. In one embodiment, the transmission (14) comprises a Gold Cup™ series hydrostatic transmission manufactured by Denison Hydraulics (Marysville, Ohio, U.S.). The contents of the Gold Cup™ transmission application manual (SP1-AM330, 2002), published by Denison Hydraulics Inc. are incorporated herein by reference.

A small low-flow hydraulic pump (16) is electrically driven by a small electric motor (18) and draws oil from a small reservoir (20). The pump (16) delivers low pressure servo control oil to the transmission (14). The low-flow pump (16) also controls the application of the parking brake (22) by releasing the brake (22) with oil pressure. The brake (22) is biased towards its applied position by a spring (24) which is overcome by sufficient oil pressure.

As windspeed increases and rotor speed increases, the fluid output of the fixed displacement motor (12) will increase, resulting in greater torque to the generator. Because the rotational speed of the transmission (14) and the generator (30) does not increase proportionately, pressure will increase in the hydraulic system. In a preferred embodiment, the hydrostatic transmission (14) includes a hydromechanical pressure compensating system to vary the displacement of the transmission in response to pressure changes in the motor (12) output. The transmission may increase its displacement in response to increases in system pressure. As a result, the greater fluid flow will drop the system pressure and maintain a relatively constant torque output. Conversely, the transmission (14) may decrease displacement in response to a decrease in system pressure, which results in reduced fluid flow.

In a preferred embodiment, the capacity of the transmission (14) and the generator (30) is chosen such that the entire output of the motor (12) may be accepted without exceeding the limits of the transmission and generator. One skilled in the art will be able to calculate the output based on the rotor (10) configuration, windspeed information and motor (12) configuration.

In a preferred embodiment, a hot oil shuttle (26) is associated with the motor (12) to provide some limited oil exchange and cooling capability. A portion of the oil flow from the low pressure return side of the hydraulic circuit is passed first through the motor (12) case and the transmission (14) case to provide some cooling of the motor and the transmission. The oil then preferably passes through a filter (34) and a cooler (36) and is returned to the reservoir (20). In one embodiment, approximately 10% of the total flow in the hydraulic circuit is passed into the hot oil shuttle (26) and may be replenished within the transmission (14) by servo control oil.

Figure 3:
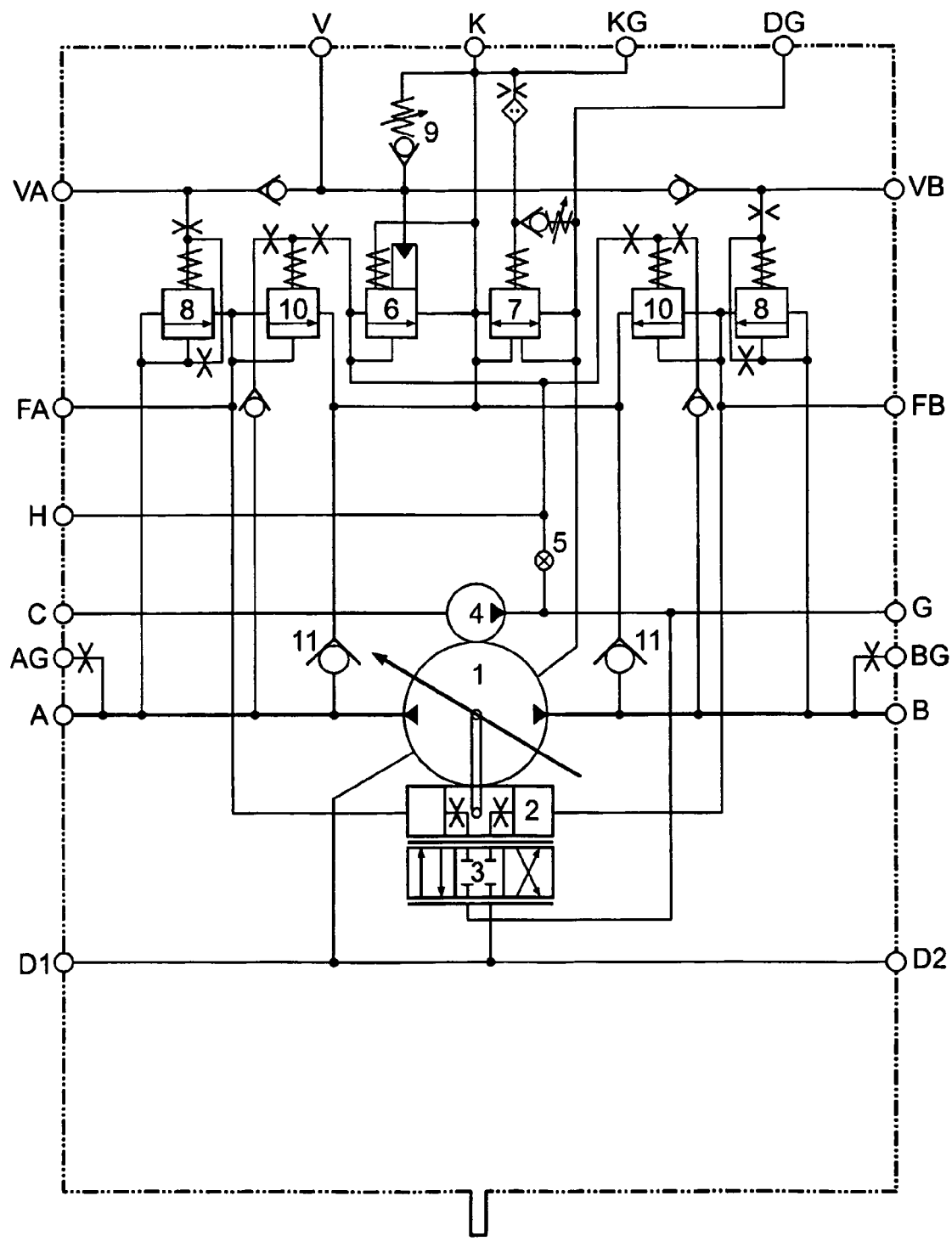
FIG. 3 is an ISO standard schematic diagram of a preferred hydrostatic transmission having pressure compensating means, used as a motor in the present invention.

An ISO standard hydraulic schematic of a preferred hydrostatic transmission (14) is shown in FIG. 3. The transmission comprises a piston pump (1) and vane chambers (2). A rotary servo (3) and auxiliary pump (4) are also provided. The servo pressure valve (6) is modulated by operating pressure. The boost replenish pressure valve permits the addition of make up oil. Other valves shown include the sequence valves (8), the compensator pilot valve (9), a dual level relief valve (10), and a replenish ring check valve (11). The ports identified are the system power ports (A, B), the system pressure gage ports (AG, BG), the auxiliary pump inlet (C), case pressure gage (DG), case drains (D1, D2), auxiliary pump outlet (G), auxiliary flow return servo pressure (H), replenishment inlet (K), replenishing pressure gage (KG), control areas (FA, FB), and compensator vents (V, VA, VB).

In the embodiment illustrated, the auxiliary pump (4) provides servo control oil and replenishing oil from the reservoir (20). The auxiliary pump (4) does not operate unless there is fluid flow through the transmission (14), either under power or under dynamic braking conditions. Therefore, the low flow pump (16) is required for startup operations.

System pressure may be monitored by a proportional pressure control valve (32) which is connected to the high pressure side of the transmission (14) and is electronically connected to a electrohydraulic servo control system which controls the transmission displacement control. One skilled in the art may design and install a suitable control system for the functions described herein.

In operation as a pump, the operating pressure side exits port (B) while the low pressure returns by port (A) in the transmission (14). In operation in a wind turbine of the present invention, the low pressure side becomes a high pressure side with the overrunning load, while the high pressure side becomes the low pressure return side to the motor (12), as shown in FIG. 2.

The transmission (14) may directly drive a generator (30), which may be any known generator adapted for use in a wind turbine. One skilled in the art may choose and configure synchronous or asynchronous induction generators in this regard. In one embodiment, the generator comprises an asynchronous induction generator (30) attached to the power grid. The interconnection between the generator (30) and the power grid may be accomplished in accordance with procedures known in the art.

As is recognized in the art, an asynchronous generator is also an induction motor. As torque is applied to the generator, electrical energy is produced as the generator (30) turns above its synchronous speed. Greater torque will fractionally increase generator speed, within the generator's slip and produce greater power. Therefore, the generator will dynamically brake the motor (12) and the rotor (10) during power generation.

In another embodiment, the motor output shaft directly drives a synchronous generator (30). In synchronous generators, which are well known in the art, the rotational speed of the generator is determined by the mains frequency. In a 4 pole synchronous generator connected to a 60 Hz grid, the synchronous generator speed is 1800 rpm. Similarly, in a 6 pole synchronous generator connected to a 60 Hz grid, the synchronous generator speed is 1200 rpm.

The generator converts mechanical energy into electrical energy. If the windspeed results in energy which exceeds the dynamic braking capability of the hydraulic circuit and generator (30) of the present invention, the transmission (14)

torque will increase the generator speed beyond the synchronous generator speed or the slip speed of an asynchronous generator. In such overspeed conditions, the wind turbine preferably comprises physical braking mechanisms. Therefore, overspeed controls which are well known in the art may be used to further control the speed of the rotor (10). For example, variable pitch or stall-regulated turbine blades may be used. In addition or alternatively, brake systems which employ a disc brake or pivoting blade tips may be employed. Yaw control systems are well known and may be employed to rotate the rotor and nacelle out of the wind direction to slow down rotor speed in high wind conditions.

In an alternative embodiment, two or more generators may be included which operate sequentially. If the windspeed results in the torque capacity of a first generator being exceeded, the second generator is brought online to absorb the excess torque and to generate additional power. The use of two or more generators operating sequentially may be advantageous over the use of a single larger generator in that the tare horsepower in the system remains at a lower level, permitting power generation at lower windspeeds.

As will be appreciated by those skilled in the art, if a power loss from the grid is suffered at the turbine and no backup power source is available, the generator magnetic field disappears and the dynamic braking capability of the generator disappears. This may result in a severe overspeed situation. Again, conventional overspeed control systems may be employed to guard against this potential situation.

Operation of one embodiment of the system will now be described. In one embodiment, a small wind indicator (not shown) is provided to sense wind speed and direction and initiate the system to enter its start up mode and the yaw control system, if employed, to turn the rotor and nacelle directly into the wind. In the appropriate wind conditions, typically once a minimum windspeed is reached, the system may be turned on, either automatically or manually. At the beginning of the start-up mode, the startup electric motor (18) switches on, powering the low-flow pump (16) which then delivers control oil to the servo system of the hydrostatic transmission (14). As well, the parking brake (22) is then deactivated. Power from the grid, or from a backup power source, is connected to the generator (30) which will then rotate, reaching its synchronous rotational speed. The generator acts as an electric motor and drives the hydrostatic transmission (14). The hydrostatic transmission (14) acts as a pump and drives the motor (12), which turns the rotor (10). Assuming there is sufficient wind energy, the rotor will accelerate until its wind-driven rotational speed exceeds a predetermined minimum speed, at which point the rotor is acting on the motor (12). At that point, the system will shift to a power generation mode and the rotor will become an overrunning load on the motor (12) as described above. The motor (12) will then act as a pump and deliver oil pressure back to the transmission (14). An rpm sensor on the rotor and/or pressure sensors in the hydraulic circuit will signal the switch over from startup mode to the power generation mode.

Because, in one embodiment, the motor (12) is a fixed displacement motor, the flow of hydraulic fluid is directly proportional to rotor speed. Fluid pressure within the hydraulic system is proportional to torque in the generator. After the switch to the power generation mode, the pressure compensating means on the transmission controls the torque generated by the transmission (14) by varying the displacement of the transmission, and therefore controls the input shaft torque to the generator.

The use of the generator (30) as an electric motor to initiate rotor rotation in a start-up mode permits convenient phase matching with the utility grid. Once the generator is connected to the grid and is operating like an electric induction motor, the grid determines the phase relationship of the generator/motor with the grid. Upon switchover to power generation, once rotor speed is sufficient to create power in the transmission (14) and generator (16) to generate electricity, the produced power will be phase-matched to the grid.

Alternatively, the system may be designed without an active startup procedure as described above. In a passive startup, the system will determine when there is sufficient windspeed to rotate the rotor at a sufficient speed to generate useful power. Again, the low flow pump (16) is started which releases the brake (22). Once rotor has reached a speed such that the motor (12) is generating sufficient pressure to drive the transmission (14) to drive the generator (30) at its designed speed, the generator may be switched on to produce electrical power.

In either instance, once power generation has commenced, increases in windspeed results in increased rotor speed and increased torque being applied to the generator. The control system of the wind turbine is configured to activate the overspeed control systems described above when the torque capacity of the generator, or the pressure capacity of the hydraulic system, or both, is reached. Emergency stops may be programmed into the control system to deal with power irregularities or outages in the utility grid or in extreme overspeed situations where the brake systems are not able to control the generator speed.

If windspeed drops below a predetermined level, such that little or no torque is being applied to the generator, the generator may be switched off and the brake applied until windspeed again increases.

As will be apparent to those skilled in the art, various modifications, adaptations and variations of the foregoing specific disclosure can be made without departing from the scope of the invention claimed herein.

What is claimed is:

1. A wind turbine comprising:
   (a) a rotor;
   (b) a generator;
   (c) a low-speed positive displacement hydraulic motor driven by the rotor to act as a hydraulic pump;
   (d) a variable displacement hydraulic transmission which is connected to and drives the generator, wherein the transmission accepts the entire output of the motor acting as a pump;
   (e) a closed loop hydraulic oil circuit for carrying pressurized oil to the transmission from the motor acting as a pump and to return oil to the motor acting as a pump from the transmission wherein the closed loop circuit directly connects the motor acting as a pump output and the transmission input without diversion; and
   (f) means for varying the displacement of the transmission in response to variations in pressure within the oil circuit.

2. The system of claim 1 wherein the hydraulic motor is driven at the same rotational speed as the rotor.

3. The system of claim 1 wherein the rotor comprises a horizontal axis wind turbine rotor and wherein the hydraulic motor, hydraulic transmission, closed loop oil circuit and generator are tower mounted.

4. The system of claim 1 wherein the displacement variation means comprises a hydromechanical system comprising a pressure compensating valve operatively connected by means of servo control oil to a mechanical actuator.

5. The system of claim 1 further comprising a hot oil shuttle.

6. The system of claim 1 further comprising:
(a) brake means for stopping the rotor, which brake is biased towards contact with the rotor shaft and which is released by oil pressure; and
(b) means for pumping oil to develop brake release oil pressure.

7. The system of claim 1 wherein the generator is an asynchronous induction generator.

8. The system of claim 1 wherein the generator is a synchronous generator.

9. The system of claim 1 wherein the rotor comprises a vertical axis wind turbine rotor.

10. A method of generating electricity from wind power using a tower-mounted rotor, and a generator, comprising the steps of:
(a) directly coupling a low-speed, high torque hydraulic motor to the rotor, such that the motor may act as a pump, turning at a rotational speed of less than 100 rpm when driven by the rotor;
(b) operatively connecting a variable displacement hydraulic transmission to the hydraulic motor acting as a pump by a closed hydraulic circuit such that the transmission acts as a motor, wherein the closed circuit directly connects the hydraulic motor acting as a pump output and the transmission input without diversion and the transmission accepts the entire output of the motor acting as a pump;
(c) coupling the transmission to a generator, driving the generator at speed effective to produce electricity.

11. The method of claim 10 wherein the displacement of the displacement of the hydraulic transmission is varied in response to variations in the pressure generated by the hydraulic motor acting as a pump.

12. The method of claim 10 further comprising a startup step of connecting the generator to a power grid such that the generator becomes an electric motor, thereby driving the transmission, the motor, and the rotor until the rotor becomes wind-driven.

13. The method of claim 10 further comprising the step of exchanging heated oil for cooler oil, during wind-driven operation, in a hot oil shuttle which forms part of the closed hydraulic circuit.

14. A wind turbine tower comprising a rotor, a generator and a closed loop hydraulic power transmission system comprising:
(a) a low-speed positive displacement hydraulic motor which is driven by the rotor without speed increasing gears;
(b) a variable displacement hydraulic transmission which is connected to and drives the generator and which includes means for varying the displacement of the transmission in response to changes in pressure in the hydraulic system, wherein the transmission accepts the entire output of the motor;
(c) a closed loop oil circuit for carrying pressurized oil to the transmission from the hydraulic motor and to return oil to the hydraulic motor from the transmission, which directly connects the motor output and the transmission input without diversion;
(d) wherein the rotor-driven motor and transmission operate under an overrunning load condition to drive the generator; and wherein
(e) the generator and closed loop hydraulic power transmission system are tower mounted above ground.

* * * * *